United States Patent [19]

Dauerer et al.

[11] Patent Number: 6,035,309
[45] Date of Patent: Mar. 7, 2000

[54] SYSTEM AND METHOD FOR EDITING AND VIEWING A VERY WIDE FLAT FILE

[75] Inventors: Norman Joseph Dauerer, Hopewell Junction; Edward Emile Kelley, Wappingers Falls, both of N.Y.

[73] Assignee: International Business Machines Corporation, Armonk, N.Y.

[21] Appl. No.: 08/883,266

[22] Filed: Jun. 26, 1997

Related U.S. Application Data

[63] Continuation of application No. 08/474,204, Jun. 7, 1995, abandoned, which is a continuation-in-part of application No. 08/367,902, Jan. 3, 1995, abandoned, which is a continuation of application No. 08/015,690, Feb. 9, 1993, abandoned.

[51] Int. Cl.[7] ................................................ G06F 17/21
[52] U.S. Cl. .......................................... 707/503; 707/530
[58] Field of Search .................................. 707/503, 904, 707/530

[56] References Cited

U.S. PATENT DOCUMENTS

| | | | |
|---|---|---|---|
| 4,386,410 | 5/1983 | Pandya et al. | 364/518 |
| 4,412,294 | 10/1983 | Watts et al. | 364/518 |
| 4,533,910 | 8/1985 | Sukonick et al. | 340/721 |
| 4,574,364 | 3/1986 | Tabata et al. | 364/900 |
| 4,786,897 | 11/1988 | Takanashi et al. | 340/721 |
| 4,803,478 | 2/1989 | Olsen | 345/124 |
| 4,873,514 | 10/1989 | Nakagawa et al. | 340/726 |
| 4,962,475 | 10/1990 | Hernandez et al. | 364/900 |
| 5,006,837 | 4/1991 | Bowers | 345/123 |
| 5,014,222 | 5/1991 | Donahue | 364/521 |
| 5,038,138 | 8/1991 | Akiyama et al. | 345/123 |
| 5,075,673 | 12/1991 | Yanker | 345/123 |
| 5,208,588 | 5/1993 | Nishiyama | 345/123 |
| 5,247,611 | 9/1993 | Norden-Paul et al. | 395/161 |
| 5,263,134 | 11/1993 | Paal et al. | 345/123 |

OTHER PUBLICATIONS

Campbell, "dBase IV 1.5 Handbook Second Edition", Bantam Books, pp. 3–19, 29–38, 119–160, 685–702, and 817–832.

"Sysout Archival and Retrieval", Software Magazine, vol. 12, No. 5 (Apr. 1992), p. 93.

Sternberg, Basic Computer Programs for Business, p. 134–140, 1980.

Kochan et al., Exploring the UNIX System, p. 90–94, 1984.

Borland, Quattro Pro for Windows User Manual, p. 85, 362, 363, 1992.

Patent application No. 07/754,923 filed Sep. 4, 1991 entitled "Front End For File Access Control System" IBM Docket No. F19–91–044 by Norman J. Dauerer, et al.

Patent application No. 07/755,036 filed Sep. 4, 1991 entitled "Data Base System for Intersite Line Comparison" IBM Docket No. F19–91–037 by Norman J. Dauerer, et al.

Primary Examiner—Joseph H. Feild
Assistant Examiner—R Bourque
Attorney, Agent, or Firm—Jay H. Anderson; Graham S. Jones, III

[57] ABSTRACT

A system provides for the easy editing of wide files for convenient viewing of selected columns, through the use of a function key that invokes a window which lists multiple possible combinations of views of the file which can be selected to present a choice of fields to be viewed simultaneously on the same screen. The fields represent a collection of columns which are a subset of the columns of the entire file. The system presents selected columns of data in a narrow width to facilitate viewing, comprehending, and/or editing the data.

18 Claims, 6 Drawing Sheets

```
INTERSITE LINE COMPARISON SYSTEM

|...+....1....+....2....+....3....+....4....+....5....+....6....+....7..
  00000 * * * TOP OF FILE * * *
  00001 BBRAITIS * AM BBRAITIS      02AD1F191096 FSHVMTP  BBRAIRIS  107016 FSH
  00002 BBRAM    * AM BBRAM         24QB2F131752 FSHVMTP  BBRAM     144185 FSH
  00003 EBRAMS   ------------------------------------------------- 150566 FSH
  00004 DCHARY  |    MOVE THE CURSOR TO SELECT AND PRESS ENTER.  | 144185 FSH
  00005 FDAMSK  |  SELECT "ILCV 1" FOR NAME AND DISKS.           | 177731 FSH
  00006 BDDISS  |  SELECT "ILCV 2" FOR NAME, SERIAL AND MANAGER DATA.| 134856 FSH
  00007 BDDISS  |  SELECT "ILCV 3" FOR ENTIRE FILE.              | 167661 FSH
  00008 EDWALP  |  SELECT "ILCV 4" FOR ID, NAME SERIAL AND DISKS | 171883 FSH
  00009 DFFRON  |  SELECT "ILCV 5" FOR ID, SERIAL AND DISKS      | 110749 FSH
  00010 FGNELL  |  PF 3 END  PF 7 BACKWARD PF 8 FORWARD          | 111003 FSH
  00011 BGOSTI  ------------------------------------------------- 128260 FSH
  00012 BGUNZO  * THOMAS BGUNZO     35ZA1F115340 FSHVMTP  BGUNZO   126356 FSH
  00013 EIKEN   * E EIKEN (T)       24QB2F181716 FSHVMTP  EIKEN    144185 FSH
  00014 DINSWORD * DAWN DINSWORTH   34FA1F106501 FSHVMTP  DINSWORD 134421 FSH
  00015 FLANPIC * ALAN FICIACCHIO   19KA1F121669 FSHVMTP  FLANPIC  110039 FSH
  00016 BLFONSO * ELEANOR BLFONSO   22YB1K125959 FSHVMTP  BLFONSO  138186 FSH
  00017 BLLENP  * PAUL BLLEN        35ZC3F156891 FSHVMTP  BLLENP   154106 FSH
  PF 1 HELP    2 SPLT/JOIN   3 FILE   4 VIEWS   5 CHANGE   6 SAVE
  PF 7 BACKWARD 8 FORWARD    9 ?     10 RIGHT  11 LEFT    12 QUIT
  ===>
```

```
INTERSITE LINE COMPARISON SYSTEM

|....+....1....+....2....+....3....+....4....+....5....+....6....+....7..
00000 * * * TOP OF FILE * * *
00001 BBRAITIS * AM BBRAITIS           02AD1F191096 FSHVMTP BBRAITIS  107016 FSH
00002 BBRAM    * AM BBRAM              24QB2F131752 FSHVMTP BBRAM     144185 FSH
00003 EBRAMSN  * N  EBRAMS             31PA1F100165 FSHVMTP EBRAMSN   150566 FSH
00004 DCHARYA  * SC DCHARYA            24QB2F117247 FSHVMTP DCHARYA   144185 FSH
00005 FDAMSKI  * JOHN FDAMSKI          16ZA1F127126 FSHVMTP FDAMSKI   177731 FSH
00006 BDDISS   * WD BDDISS             72BA1F196854 FSHVMTP BDDISS    134856 FSH
00007 BDDISSM  * MAUREEN BDDISS        02HB2F122478 FSHVMTP BDDISSM   167661 FSH
00008 EDWALPA  * AVI EDWALPACKER       37YA1F100616 FSHVMTP EDWALPA   171883 FSH
00009 DFFRONTI * JA DFFRONTI           21YA1F100015 FSHVMTP DFFRONTI  110749 FSH
00010 FGNELLO  * IRIS FGNELLO          43KA1F130087 FSHVMTP FGNELLO   111003 FSH
00011 BGOSTINP * PATSY BGOSTINO        41AA1F123638 FSHVMTP BGOSTINP  128260 FSH
00012 BGUNZO   * THOMAS BGUNZO         35ZA1F115340 FSHVMTP BGUNZO    126356 FSH
00013 EIKEN    * E EIKEN (T)           24QB2F181716 FSHVMTP EIKEN     144185 FSH
00014 DINSWORD * DAWN DINSWORTH        34FA1F106501 FSHVMTP DINSWORD  134421 FSH
00015 FLANPIC  * ALAN FICIACCHIO       19KA1F121669 FSHVMTP FLANPIC   110039 FSH
00016 BLFONSO  * ELEANOR BLFONSO       22YB1K125959 FSHVMTP BLFONSO   138186 FSH
00017 BLLENP   * PAUL BLLEN            35ZC3F156891 FSHVMTP BLLENP    154106 FSH
PF 1 HELP      2 SPLT/JOIN    3 FILE    4 VIEWS     5 CHANGE    6 SAVE
PF 7 BACKWARD  8 FORWARD      9 ?      10 RIGHT    11 LEFT     12 QUIT
===>
```

FIG. 5

```
INTERSITE LINE COMPARISON SYSTEM
       |....+....1....+....2....+....3....+....4....+....5....+....6....+....7..
00000 * * * TOP OF FILE * * *
00001 BBRAITIS * AM BBRAITIS              02AD1F191096 FSHVMTP BBRAIRIS  107016 FSH
00002 BBRAM    * AM BBRAM                 24QB2F131752 FSHVMTP BBRAM     144185 FSH
00003 EBRAMS                                                             150566 FSH
00004 DCHARY   |       MOVE THE CURSOR TO SELECT AND PRESS ENTER.      | 144185 FSH
00005 FDAMSK   | SELECT "ILCV 1" FOR NAME AND DISKS.                   | 177731 FSH
00006 BDDISS   | SELECT "ILCV 2" FOR NAME, SERIAL AND MANAGER DATA.    | 134856 FSH
00007 BDDISS   | SELECT "ILCV 3" FOR ENTIRE FILE.                      | 167661 FSH
00008 EDWALP   | SELECT "ILCV 4" FOR ID, NAME SERIAL AND DISKS         | 171883 FSH
00009 DFFRON   | SELECT "ILCV 5" FOR ID, SERIAL AND DISKS              | 110749 FSH
00010 FGNELL   | PF 3 END   PF 7 BACKWARD PF 8 FORWARD                 | 111003 FSH
00011 BGOSTI
00012 BGUNZO   * THOMAS BGUNZO            35ZA1F115340 FSHVMTP BGUNZO    128260 FSH
00013 EIKEN    * E EIKEN (T)              24QB2F181716 FSHVMTP EIKEN     126356 FSH
00014 DINSWORD * DAWN DINSWORTH           34FA1F106501 FSHVMTP DINSWORD  144185 FSH
00015 FLANPIC  * ALAN FICIACCHIO          19KA1F121669 FSHVMTP FLANPIC   134421 FSH
00016 BLFONSO  * ELEANOR BLFONSO          22YB1K125959 FSHVMTP BLFONSO   110039 FSH
00017 BLLENP   * PAUL BLLEN               35ZC3F156891 FSHVMTP BLLENP    138186 FSH
                                                                         154106 FSH
PF 1 HELP      2 SPLT/JOIN    3 FILE       4 VIEWS     5 CHANGE    6 SAVE
PF 7 BACKWARD  8 FORWARD      9 ?         10 RIGHT    11 LEFT     12 QUIT
===>
```

FIG. 6

```
INTERSITE LINE COMPARISON SYSTEM

|...+...10....+...100....+..110....+..120....+..130....+..140....+..150..
00000 *** TOP OF FILE ***
00001 BBRAITIS  * >  193 197 198 199 202     210
00002 BBRAM     * >  193 197 198 199 202 207
00003 EBRAMSN   * >  193 197     199 202 207 210
00004 DCHARYA   * >  193 197 198 199 202 207
00005 FDAMSKI   * >  193 197     199 202 207 210 205 219 401                 209
00006 BDDISS    * >                  199 202
00007 BDDISSM   * >  193 197 198     202 207                     401
00008 EDWALPA   * >  193 197 198 199 202 207 210         219 401
00009 DFFRONTI  * >  193     198 199 202 207 210                 401
00010 FGNELLO   * >  193 197 198 199 202 207 210                 401
00011 BGOSTINP  * >  193 197 198     202 207 210                             327
00012 BGUNZO    * >  193 197 198 199 202 207 210         219
00013 EIKEN     * >  193 197 198 199 202 207 210                 401
00014 DINSWORD  * >  193 197 198 199 202 207 210                 401
00015 FLANPICD  * >  193     198 199 202 207 210                 401
00016 BLFONSO   * >  193             202     207
00017 BLLENP    * >  193         198 202     207
PF 1 HELP      2 SPLT/JOIN  3 FILE   4 VIEWS    5 CHANGE    6 SAVE
PF 7 BACKWARD  8 FORWARD    9 ?     10 RIGHT   11 LEFT     12 QUIT
===>
```

SYSTEM AND METHOD FOR EDITING AND VIEWING A VERY WIDE FLAT FILE

The application is a continuation of U.S. patent application Ser. No. 08/474,204, filed Jun. 7, 1995 now abandoned, which is a continuation-in-part of U.S. patent application Ser. No. 08/367,992, filed Jan. 3, 1995 now abandoned, which was a continuation of U.S. patent application Ser. No. 08/015,690 filed on Feb. 9, 1993 now abandoned.

BACKGROUND OF THE INVENTION

1. Field of the Invention

This invention relates to a system and a method for editing and viewing widely spaced data in very wide data processing files.

2. Description of Related Art

Electronic computers can store files to be displayed with a number of vertical columns and a number of horizontal rows of data. The widths can be extremely wide. However, the tradition for computer screens is for there to be eighty vertical columns or a little wider, which correlates with the eighty vertical columns of a standard data processing punch card.

The problem addressed by this invention relates to the fact that when a large number of columns are side by side in a computer file being viewed with an Editor or a Viewing program they cannot be easily correlated without extensive effort by the user. Each user currently needs to do side to side scrolls when editing very wide electronic files to correlate the data they wish to review at a given moment. This problem is typical of very wide files, such as in the Dauerer and Kelley "Front End for File Access Control System," abandoned U.S. patent application Ser. No. 07-754,923, filed Sep. 4, 1991, Dauerer and Kelley, "The RACF Front End Extension" copending U.S. Pat. No. 5,469,576 issued Nov. 21, 1995, which supports the Dauerer and Kelley, "Database System for Intersite Line Comparison" U.S. Pat. No. 5,475,833 issued Dec. 12. 1995.

Files that are used for on-line editing or viewing by a user have traditionally been limited to a width of 80 columns or a little wider. Even though most operating systems have the capability (given enough time and manipulation) to display very wide files, up to 65,335 bytes as is the case with the IBM VM operating system, practical usage of this capability has not been possible.

The reason that wide files are not used is that they present two extremely difficult problems. The first is that wide files require the user to contend with two more dimensions in order to view or manipulate a file. For example, a narrow file, one that fits the standard screen width size of 80 columns, requires only two controls to scroll through the file, up and down. A wide file, on the other hand, requires an additional left control and an additional right control. The second problem is that when viewing or editing a file, one needs (or would prefer) to have certain related information displayed on the screen, all at once, in order to make sense out of what is being observed. One might need to have data in columns 1–8, 345–367, and 1120–1128 on the screen simultaneously, but that is impossible to do without reformatting the files. Users would sooner reformat and process multiple files than jockey back and forth from left to right and back to the left, from one end of one row of a wide file to another end of the same row in the wide file, but that is expensive and/or very time consuming.

An object of this invention is to aid users to view or manipulate wide data processing files without having to reformat those files.

Another object of this invention is to eliminate or greatly reduce the need for users to do side to side scrolls when editing very wide electronic files to read data spaced apart by several columns beyond the field of view of a single screen.

A further object of this invention is to aid users to manipulate wide files in a way which presents columns of information in the positions desired regardless of the positions of the columns in the stored data base.

In accordance with this invention, a data processing system comprising a central processing unit, a random access storage device and a terminal with a display screen capable of displaying a predetermined number of columns at one time, a) means for storing data in the random access storage device having a number of columns greater than the number that can be displayed at one time by the display screen, b) means for retrieving data from the storage device into the processing unit, and c) means for managing the display of the columns of data including interactive means at the terminal for selecting sequences of columns of data to be juxtaposed on the screen.

Further in accordance with this invention the interactive means comprises actuation of predetermined functional elements on the terminal.

Still further in accordance with this invention the data processing system provides selection of the list by the steps as follows:

a) displaying a window of all of the available views for the file being viewed, b) responds to the selection the view of the file to be displayed, and c) displays the selected view of the file.

Preferably the selected view of the file is in the edit mode to be edited.

In another aspect of this invention, the data processing system performs the steps as follows:

a) gets a file, b) opens the file, c) displays the file, d displays a window of all of the available views for the file being viewed, e) responds to the selection of the view of the file to be displayed, and f) displays the selected view of the file.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Figure 1:
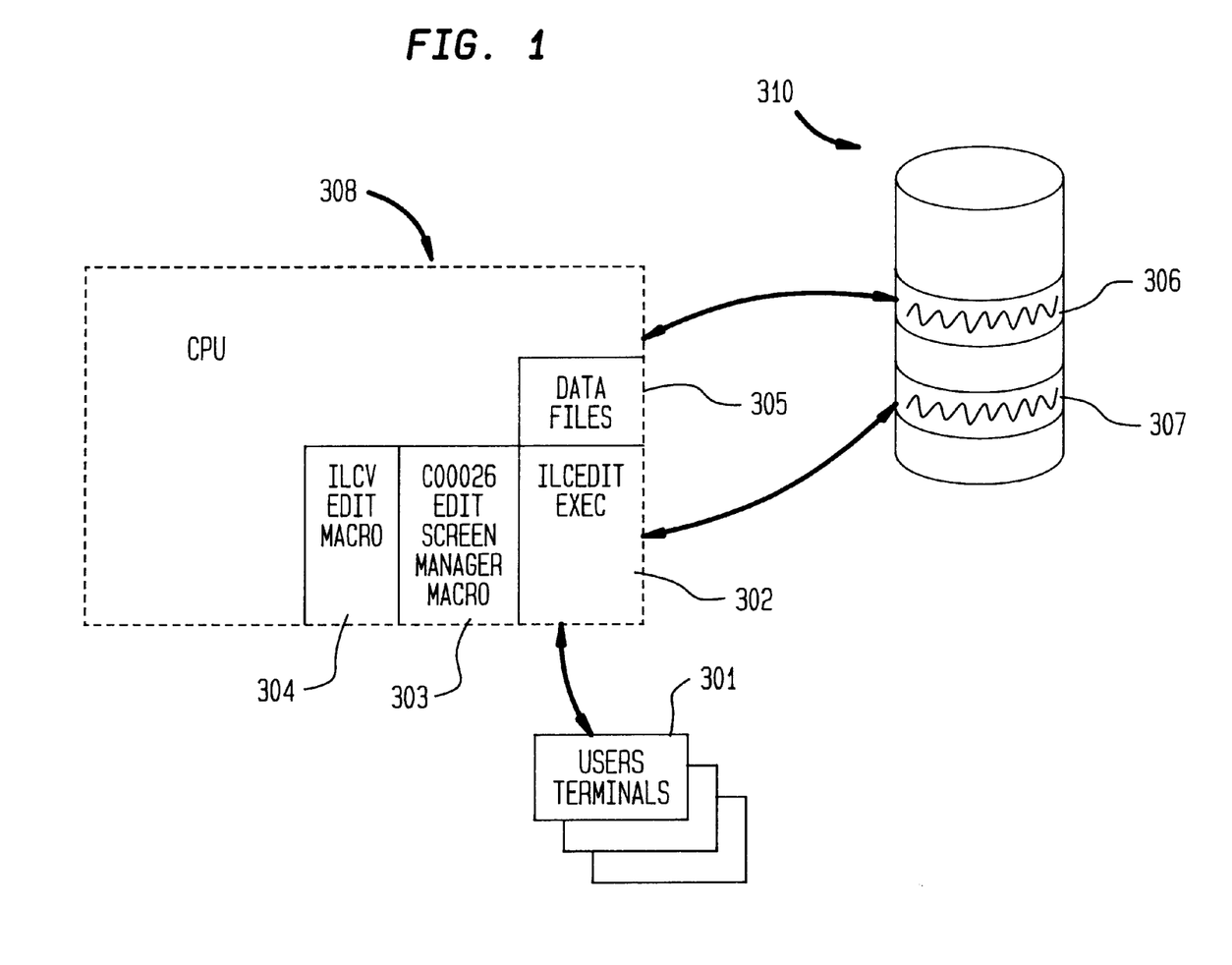
FIG. 1 shows a block diagram of a data processing system in accordance with this invention.

FIG. 1 shows a preferred embodiment of this invention in the form of a block diagram of a data processing system. The system includes computer terminals 301, a central processing unit (CPU) 308 and a storage unit 310, which comprise the hardware of the system. The computer terminals 301 for users are connected to CPU 308. The central storage unit 310 which comprises a random access storage device (which is preferably a magnetic disk drive) is also connected to CPU 308.

Programs and macros to be loaded into the CPU 308 are located in section 307 of the central disk storage unit 310. Users at computer terminals 301 LOGON to the central processing unit (CPU) 308 to issue system requests to invoke a program known as the ILCEDIT EXEC program located in memory 302 in CPU 308. The CPU 308 issues a request to the the central storage unit 310 to load the ILCEDIT EXEC program from the disk storage section 307 into the memory section 302 in the CPU 308. The CPU 308 issues a request to the central storage unit 310 to load the C00026 screen manager macro from storage section 307 into memory section 303 and screen manager into memory section 302. The CPU 308 issues a request to the central storage unit 310 to load the ILCV macro program into memory section 304 in CPU 308. Section 306 of the disk storage unit 310 is the location of the data files that are to be edited. The CPU 308 also issues a request to the central storage unit 310 to load those data files from disk storage section 306 into memory section 305 of CPU 308. Central processing unit (CPU) 308 loads the data files that will be edited together with the programs that perform the editing.

This invention provides for the easy editing of wide files through the use of a window on the display terminal screen which displays a choice of multiple views of the file under the control of a function (PF) key that invokes a window which lists multiple views of the file. Each file has a list of possible views that pertain to that file from which a selection can be made by the user who is viewing the file. Selection of a view from the window presents a display of a collection of columns which are a smaller subset of the columns of the entire file, in accordance with the choice of the user. The intent is to present related columns of data in a narrow width, less than or equal to the width of the viewing screen on the display unit being employed by the user, to make the data easier to view, comprehend, or edit.

The invention provides a mechanism to list the groups of columns that constitutes a view of the file. The view that is presented may be of any width. There may be an unlimited number of views of a file. Each of these views is listed in a table. The invention provides a mechanism for displaying the optional views, choosing a view and reformatting the file into the selected view.

The system consists of 3 program elements as follows:
ILCEDIT EXEC program
C00026 EDIT screen manager macro
ILCV EDIT macro.

To edit a wide file enter into the ILCEDIT EXEC program an argument, where the argument is the name of the wide file to be edited. ILCEDIT EXEC acquires data to determine the width of the file to be edited and it saves that width data by placing the value in a global variable (storage unit). The ILCEDIT EXEC also calls the system editor, and invokes the C00026 EDIT screen manager macro and passes along the file name of the file to be edited.

The C00026 EDIT screen manager macro provides a series of $PF_{key}$ options which are listed at the bottom of the screen. One of the $PF_{keys}$ is listed as VIEWS. Activating the $PF_{key}$ marked VIEWS provides on the screen of the computer monitor a window with a list of viewing options. Selecting one of these options edits the same file displaying only the columns indicated by the selected viewing option.

Pressing the $PF_{key}$ for VIEWS triggers the C00026 EDIT screen manager macro to call the ILCEDIT EXEC program passing a parameter which indicates that the VIEWS window is required. The ILCEDIT EXEC program supplies the text, located in the VIEWS text table, for the window and calls a windows program to display the text which represents a list of choices of the columns to be displayed.

Selecting one of these choices invokes the ILCV EDIT macro view program. This program retrieves data on the size of the file being edited from global storage and calls the system editor specifying the pairs of columns to be displayed by the system editor. The system editor displays the file to be edited with the currently requested view of the pairs of columns.

The ILCEDIT EXEC then calls the system editor with the C00026 EDIT program as the editor profile. This profile presents the $PF_{key}$ options at the bottom of the screen. One of the options is VIEWS. If the $PF_{key}$ for VIEWS is chosen then a window is presented with the list of views for the file. The window is generated by a call back to the original program ILCEDIT EXEC by the C00026 EDIT macro profile.

Selecting one of the views results in a call to the ILCV EDIT macro with an argument which represents the appropriate view. The ILCV EDIT macro uses the argument to select the appropriate instruction to present the selected view. In addition, the ILCV EDIT macro gets the width of the edited file from a storage area where it was stored by ILCEDIT EXEC. Further, the ILCV EDIT macro uses this width as a variable together with a previously coded list of selected columns to call the VM system EDIT macro to present the specified view.

Figure 2:
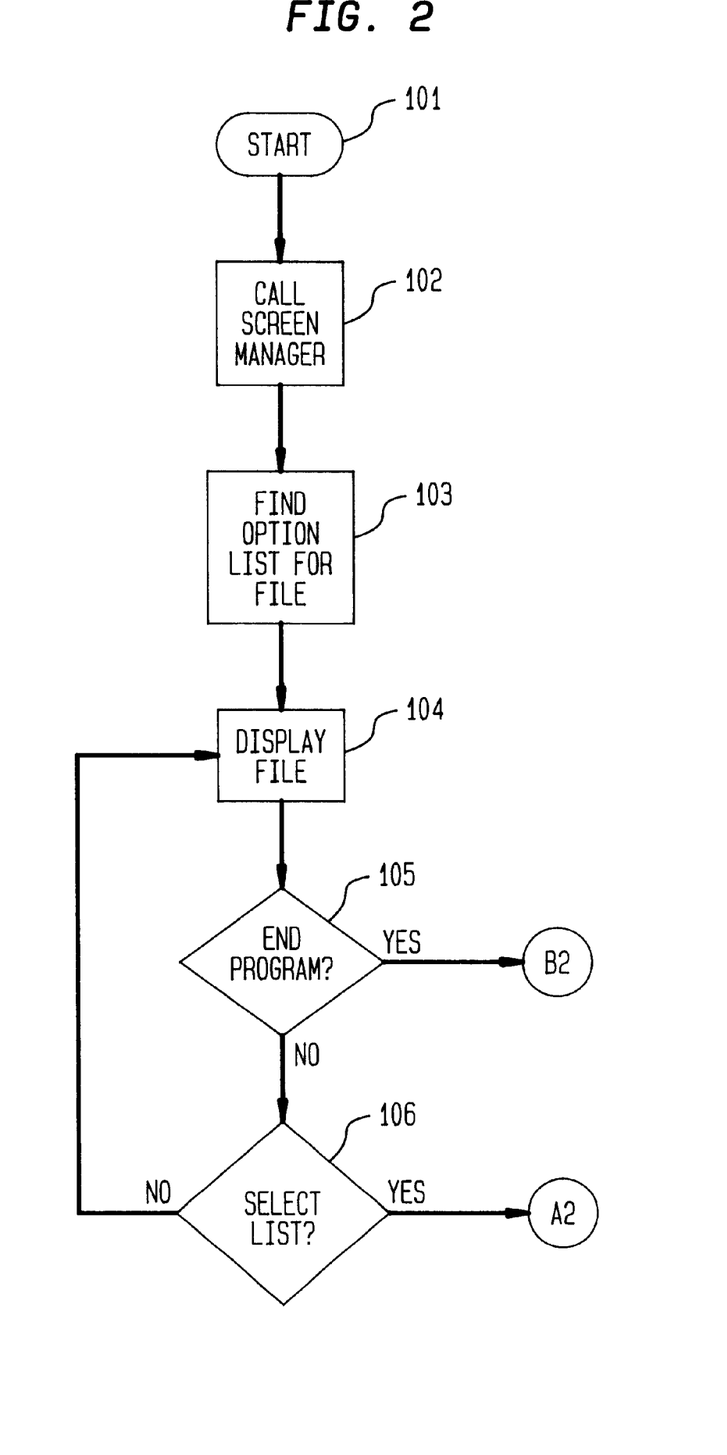
FIG. 2 shows a flow chart of a first part of the method of operation of the system in accordance with this invention.

FIG. 2 is a flow chart of a first part of the method of operation of the system in accordance with this invention. Referring to FIG. 2, the flow chart is as follows:

| | |
|---|---|
| Operation 101 | Start the program (e.g call ILCEDIT EXEC with an argument comprising the name of the file to be edited.) |
| Operation 102 | Invoke the ILCEDIT EXEC program with the name of the file to be edited. The ILCEDIT EXEC program determines the size of the file to be edited, places the value in a global variable, calls the system editor program (which can be any editor as will be well understood by those skilled in the art), invokes the C00026 EDIT screen manager program and passes (calls the program and gives it a parameter) the file name to be edited. At this point the file may be edited. |

-continued

Figure 3:
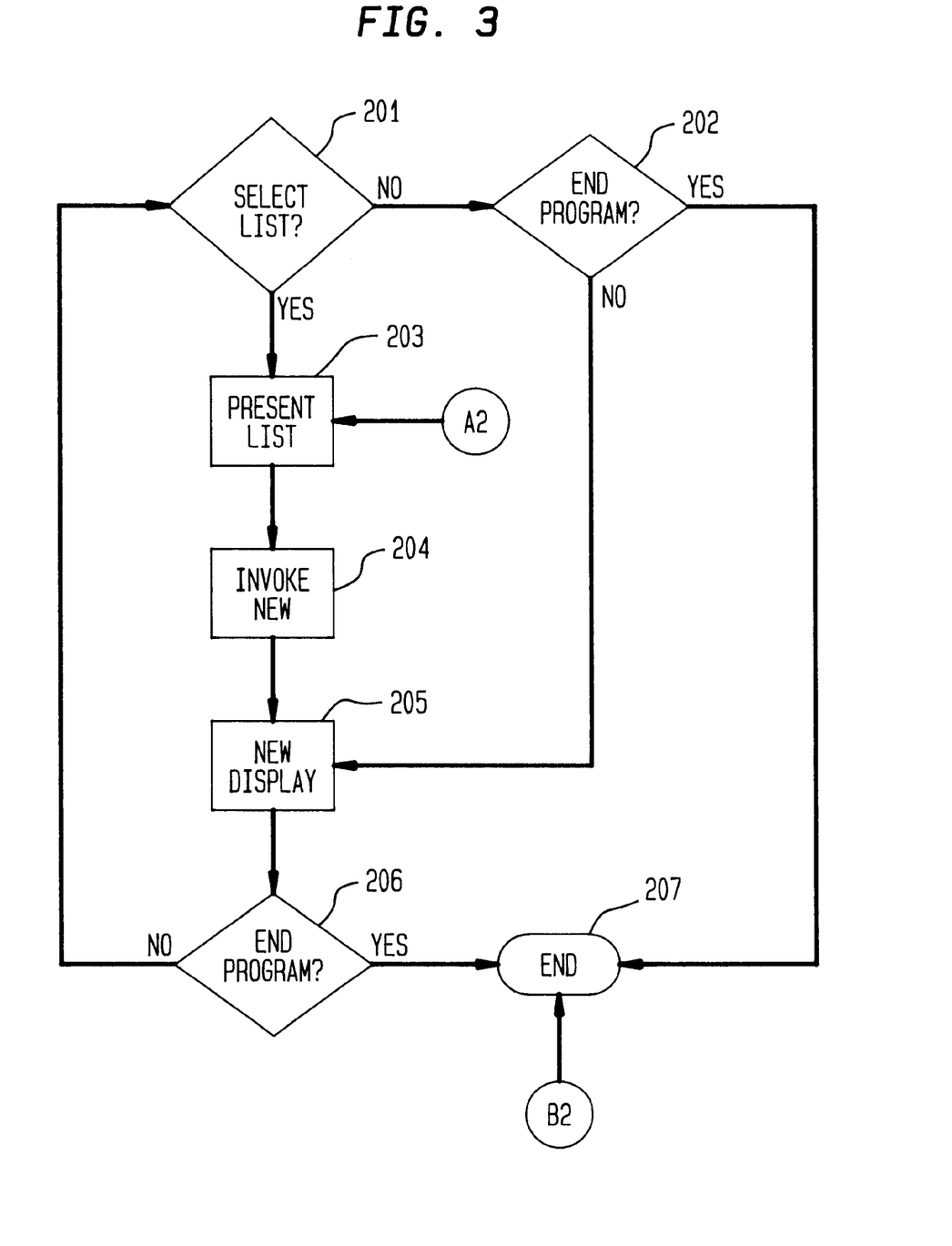
FIG. 3 is a flow chart showing additional features of the method of operation of a system in accordance with this invention.

| | |
|---|---|
| OPERATION 103 | The C00026 EDIT screen manager macro provides (for a file to be viewed) a series of $PF_{key}$ options which will be listed at the bottom of the screen. One of the $PF_{keys}$ is listed as VIEWS. Operation of the $PF_{key}$ listed as VIEWS provides a window with a list of viewing options which show different sets of columns. Selecting one of these options edits the same file displaying only the columns indicated by the selected viewing option. |
| OPERATION 104 | Display the file with the indicated editor. |
| OPERATION 105 | Should we end the program? If YES then call the end routine by branching at branch B2 to Operation 207 (FIG. 3). If NO, then go on to Operation 106. |
| OPERATION 106 | Has the $PF_{key}$ for VIEWS been selected which indicates a a request to see the list of viewing selections? If YES then branch by calling branch A2 in FIG. 3 to provide the Present List in operation 203. If NO, then return back up to repeat Operation 104. |

FIG. 3 is a flow chart showing additional features of the method of operation of a system in accordance with this invention. Referring to FIG. 3, the flow chart is as follows:

| | |
|---|---|
| OPERATION 201 | Is this a request to see the list of viewing selections? If YES go to operation 203. If NO, go to operation 202. |
| OPERATION 202 | Is this a request to end the program? If YES, end the program by going to Operation 207. If NO, go to Operation 205. |
| OPERATION 203 | Present a window of all of the available views for the file being edited. These views are found in the option list table. Pressing the $PF_{key}$ for VIEWS triggers the C00026 EDIT screen manager macro to call the ILCEDIT EXEC program passing a parameter that indicates the VIEWS window is required. The ILCEDIT EXEC program supplies the text, located in the VIEWS text table, for the window and calls a windows program to display the text which represents a list of choices of the columns to be displayed. |
| OPERATION 204 | Invoke the ILCV EDIT macro to call the data to be viewed. This program gets the size of the file being edited from global storage and calls the system editor with the pairs of columns to be displayed by the ILCEDIT EXEC. At this point the user can edit the file being displayed with the system editor. |
| OPERATION 205 | The ILCEDIT EXEC displays the file to be edited with the current requested view of the desired sets of columns. |
| OPERATION 206 | Request to end the program? If YES then end the program by going to Operation 207. |
| OPERATION 207 | End the program. |

Alternative Application

If a user wishes to pre-select a "permanent profile" from the list of possible views he may invoke the ILCEDIT EXEC program with a second parameter that indicates the view to edited. This action will cause the file to edited to be initially displayed with the pre-selected view. The view parameter will then be saved in a global variable so that the next invocation need not have a second parameter to get the pre-selected view. A global variable is stored in a file and the information stored will be shared between programs and the storage can be either temporary or permanent. Global variables address two primary needs: 1) the need for several programs to share a common set of values; 2) the need to retain those values, either temporarily of permanently, for subsequent use. The global variable will be checked by the ILCEDIT EXEC to see if a pre-selected view is required.

To remove the pre-selected view from the global variable, the ILCEDIT EXEC is invoked with the second parameter of DROP to eliminate the "permanent profile".

Figure 4:
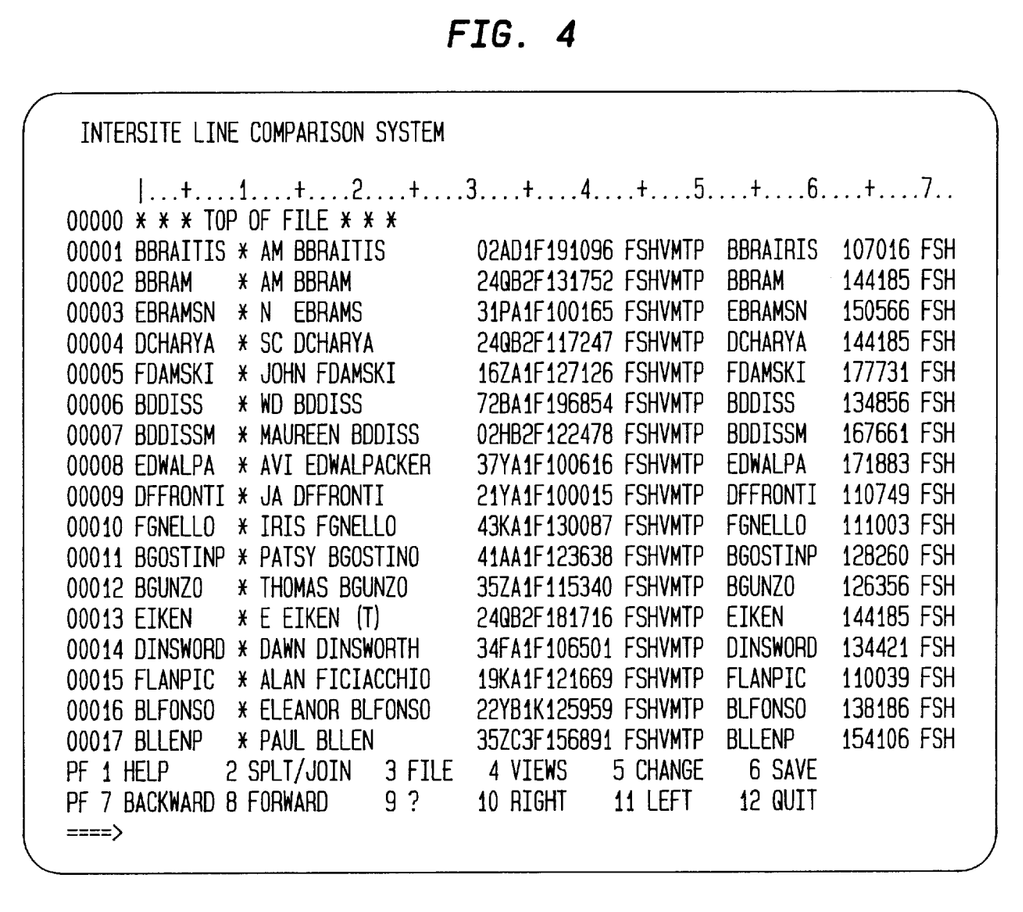
FIG. 4 shows a shows a monitor display screen with six fields of ILCS (Intersite Line Comparison System) data which will provide an example of how this invention can be employed to view selected parts of very wide files.

FIG. 4 shows a display screen with six fields of ILCS (Intersite Line Comparison System) data which will provide an example of how the instant invention can be employed to view selected parts of very wide files. FIG. 4 shows the first 72 column section of a very wide file of a hypothetical CALLUP listing of VM users. The first set of eight columns which contain the VM USERID which is to be given access to a number of disks as displayed. Columns 9–11 are also devoted to the USERID field to provide a margin including the column of asterisks. Columns 12–28 are devoted to the NAME of those users. Columns 31–42 include the department number, a serial number, etc. Columns 44–50 include the VM NODE of FSHVMTP which happens to be the same for all users on this list, columns 53–60 include the personal USERID. Columns 63–68 include manager data, and the last three columns 70–73 include location information.

Figure 5:
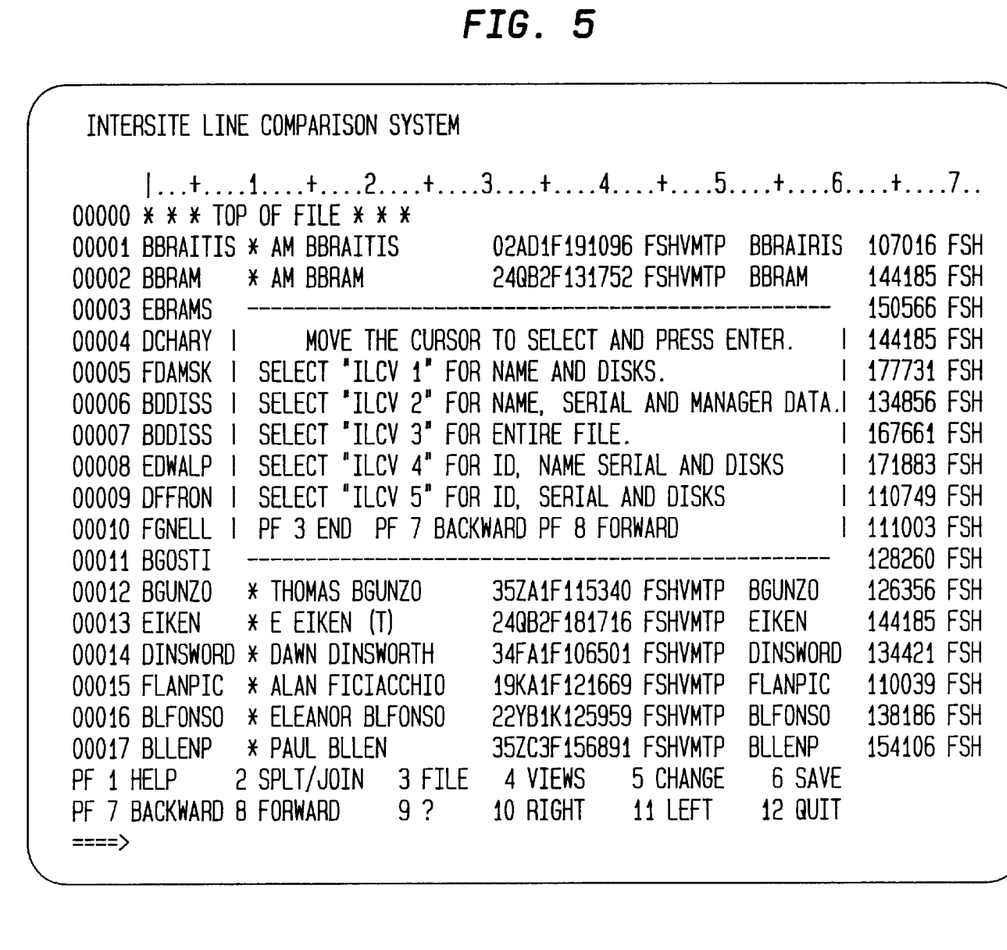
FIG. 5 shows a monitor display of the same data as FIG. 4 with a window which contains five selections for the ILCV (Intersite Line Comparison View) from which a desired view can be chosen.

An example of a window displayed on the monitor of a user terminal 301 in FIG. 1 of the system and used to select predetermined fields or sets of columns as illustrated in FIG. 5 is shown in Table I which follows:

TABLE I

| Move the cursor to select and press enter. |
|---|
| Select "ILCV 1" for name and disks. Select "ILCV 2" for name, serial and manager data. Select "ILCV 3" for entire file. Select "ILCV 4" for id, name serial and disks Select "ILCV 5" for id, serial and disks PF 3 End PF 7 Backward PF 8 Forward |

Figure 6:
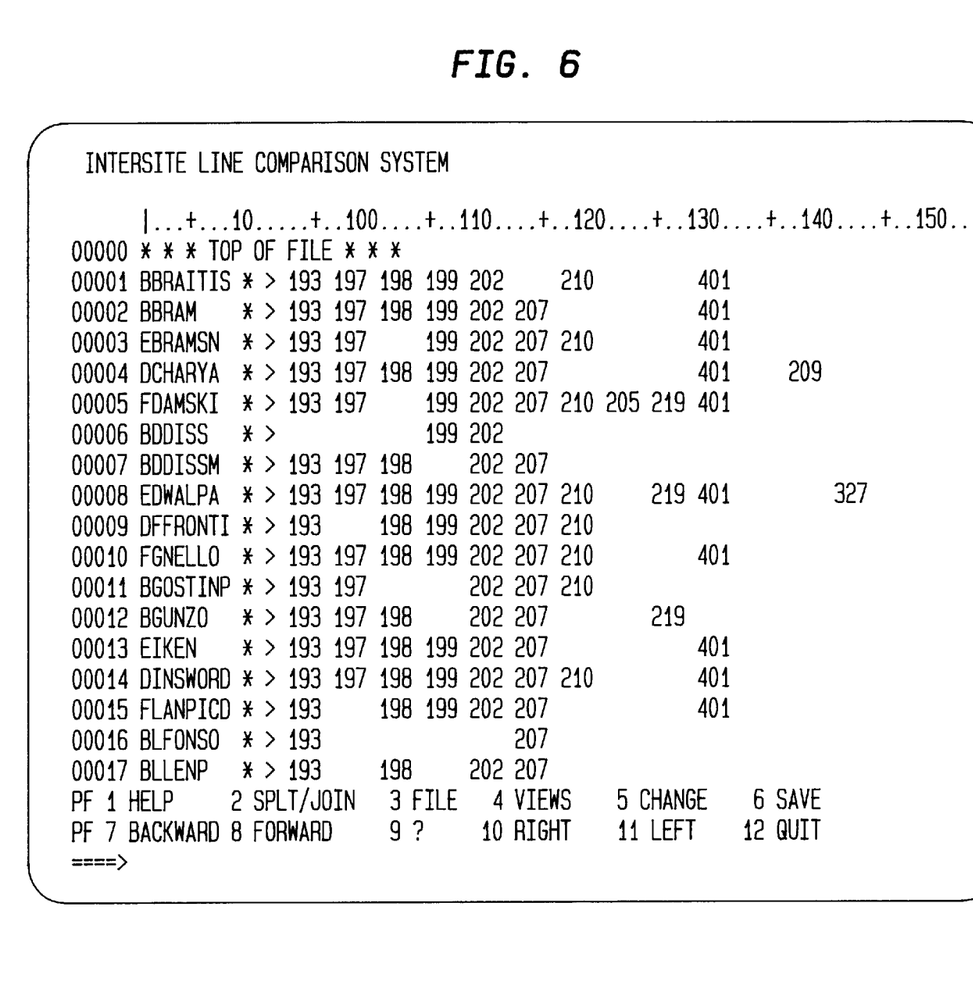
FIG. 6 shows the display which results on the monitor from entering a exemplary selected ILCV command from the monitor screen.

FIG. 5 shows a monitor display of the same data as FIG. 4 with a window which contains five selections for the ILCV (Intersite Line Comparison View) from which a desired view can be chosen. By moving the cursor and pressing enter, the user of a user terminal 301 can select one of the five arrangements of the fields to be displayed on the monitor of the user terminal. In the case of "ILCV 1", the name and the disks to which the user is connected are displayed, as is illustrated in FIG. 6 which shows the result of entering the selected ILCV command from the monitor screen. In the case of "ILCV 2", the name, serial and manager data for the user are displayed. In the case of "ILCV 3", the entire file is displayed in the same way it was in FIG. 4 again. In the case of "ILCV 4", the USERID, name, serial and disks are shown. In the case of "ILCV 5", the USERID, serial and disks are shown.

This invention is meant to address those data files that are not in an a priori formalized data base system such as dBASE IV Ver. 1.5 wherein many files of data are prepared for other purposes than data base functions. A Relational Database Management System (RDMS) is the type of rigid system that dBASE IV represents. A DB2 system is another type of RDMS system.

The essence of the instant invention can be characterized by four characteristics as follows:

First Characteristic

The first characteristic of the instant invention is that it is a flexible system which does not require a database management system. The system of the instant invention can work against a flat file prepared by anyone without any preconceived constraints which would have to be imposed by a formal database manager. An RDMS database system has a predetermined architecture which is implemented at the time of the creation of the database. The file must comply with that architecture or the database system cannot use it (unless the architecture is physically altered) since the RDMS database system is rigid and not at all free-form in concept or in function; and the architecture includes a list of field identifiers. Each field identifier has a unique name, column descriptions, and data descriptions in the database catalog table used by the RDMS database management program, unlike the system of this invention.

Second Characteristic

An RDMS system (which is a formal database management system) requires a data manipulation language to select, insert, delete, and update data on the database. The second characteristic of the instant invention is that there is no need for a data manipulation language required in order to select, insert, delete, and update data on the database. The SQL (Structured Query Language) is an example of a data manipulation language used in DB2. The database manager program expects and requires transactions to be written for data selection and update, in a format which matches the data base architecture. Exclusively numeric data is allowed in fields defined as numeric, and alphabetic data is permitted only in fields defined as alphabetic. If one wants to make a change in numeric data where it was previously described as alphabetic data, one must redefine the field description and physically alter the architecture of the data table. In some cases, extensive alterations are necessary.

Third Characteristic

The third characteristic of the instant invention is that there is no requirement of user defined indexes within the system of the invention in order to operate a system with this invention efficiently. Note that indexes in a database system are lists of pointers to records in the order of values of certain preselected sequences of fields, and that those sequences of fields serve as keys to enhance the searching of a particular database file. That while indexes are an optional feature for user-defined tables, indexes are often required for system catalog tables in a Relational Database Management System (RDMS). Moreover, indexes on very large user-defined tables are strongly recommended in an RDMS system. The disadvantage is that creation of indexes, and maintenance of the lists of pointers to records (defragmentation of space marked for deletion) adds to the overhead of traditional tasks of database management systems. Such an overhead requirement is not found in the system of the instant invention.

Fourth Characteristic

The use of a commercially-available RDMS system to edit data records of any length implies the additional task of loading the data into the constructed tables. This does not happen automatically in a product such as dBase IV Rel. 1.5 since the data must be entered in accordance with a predetermined format. The fourth characteristic of the instant invention requires only the identification of the data file to be edited, and no further interaction of the part of the user of a system operating with the instant invention since no predetermined format need be used.

There is a need in industry for a highly flexible, extemporaneous way to achieve the characteristics of the instant invention without the substantial manual work or overhead work required to achieve the result with an RDMS system.

For example in FIG. 6, with "ILCV 1" the USERID BBRATIS from the USERID field in columns 1–11 is shown on the screen as are the data on connected to disks 192, 197, 198, 199, 202, 210 and 410 from fields including columns 91–155. On line 5 USERID BDDISS is shown to be connected only to disks 199 and 202.

The selection of the "ILCV 1", "ILCV 2", "ILCV 3", "ILCV 4" or "ILCV 5" could also be made by typing the id "ILCV #" on the command line and hitting the enter key, or by using a mouse to locate the cursor on the correct position on the window in FIG. 5. Also, a light pen, or a capacitive touching of the screen of the monitor in the right location are alternative interactive means for entering the data into the system to select the menu item desired.

All that a user needs to do is move the cursor across the screen of FIG. 5 with the keys on the terminal or a mouse, etc. and select the "ILCV #" which provides the data fields desired.

While this invention has been described in terms of the above embodiment(s), those skilled in the art will recognize that the invention can be practiced with modifications within the spirit and scope of the appended claims.

Having thus described the invention, what is claimed as new and desirable and desired to be secured by Letters Patent is as follows:

1. A data processing system for editing and viewing of a very wide flat file containing more than the number of columns of data adapted to be displayed on a multiple column display screen of a display unit, said system comprising a central processing unit, a random access storage device, a terminal with function key elements and said display unit with said display screen of said display unit being capable of displaying a predetermined number of columns of data in a very wide flat file at one time, and said system including a system editor for operating in an edit mode, a) means for storing data in said random access storage device having a number of columns greater than said number of columns that can be displayed at one time by said display screen, said data being adapted to be viewed in a number of views which are available to said system from a said very wide flat file, b) means for retrieving data from said storage device from said very wide flat file into said processing unit, and c) means for displaying a list of available views in a window on said display screen, means for operating said system editor in the edit mode to edit data to provide a view of said very wide flat file which view has been interactively selected for managing the display of said columns of data from said very wide flat file on said display screen including interactive user operated editing means employing said system editor in connection with a display on said display screen of said terminal for interactive user selection with function key elements of a view of desired columns of said very wide flat file to be displayed including selection of sequences of said columns of data of said very wide flat file to be juxtaposed in the display on said screen, and said system being adapted for working against said very wide flat file prepared without a plural file relational database management system operating on more than one file at a time.

2. A data processing system in accordance with claim 1, wherein said interactive means comprises means for user actuation of said system to select said columns of data in said very wide flat file through actuation of predetermined function key elements on said terminal, said system operating without requiring a plural file relational database management system.

3. A data processing system in accordance with claim 1, wherein the system provides selection of a list of columns of data by steps as follows:

a) said flat file including said columns of data which can be viewed in a number of views which are available to said system, displaying on said display screen said window of all of said available views for said file being viewed, said views being available to be selected by user interaction initiated with function key elements, b) responding to the selection of said view of said flat file to be displayed, and c) displaying on said display screen the selected view of said flat file.

4. A data processing system in accordance with claim 3, wherein said selected view of said flat file is presented in the display on said display screen by said system editor operating in the edit mode.

5. A data processing system in accordance with claim 1, wherein the system performs the steps as follows:

a) getting a said very wide flat file, b) opening said very wide flat file, c) displaying said very wide flat file on said display screen, d) displaying on said display screen a window of all of the available views for said very wide flat file being viewed, e) responding to the selection with said function key elements of the view of said very wide flat file to be displayed by said display screen, and f) displaying the selected view of said very wide flat file on said display screen.

6. A data processing system in accordance with claim 1, wherein the system performs the steps as follows:

a) getting a said very wide flat file, b) opening said very wide flat file, c) displaying on said display screen said very wide flat file, d) displaying on said display screen a window of all of the available views for said very wide flat file being viewed, e) responding to the user selection by user interaction with said function key elements said display of said window of the available views of said very wide flat file to be displayed, and f) displaying on said display screen the selected view of said very wide flat file.

7. A method of operating a data processing system comprising a central processing unit, a random access storage device and a terminal with function key elements and with a display unit with a display screen capable of displaying a predetermined number of columns of data of a very wide flat file at one time, said system including a system editor for operating in an edit mode to edit a view of a very wide flat file, said system operating upon said very wide flat file without requiring a plural file relational database management system operating on more than one file at a time, said method comprising:

a) storing data in very wide flat files in said random access storage device having a number of columns greater than said number that can be displayed at one time by said display screen, said data being adapted to be viewed in a number of views which are available to said system, b) retrieving data from a said very wide flat file in said storage device into said processing unit, and c) displaying on said display screen a list of available views in a window on said display unit, operating said system editor in the edit mode to edit data to provide a view of said very wide flat file which view has been interactively selected by one of said function key elements for managing the display of said columns of data on said display screen including interactive user operated editing means employing said system editor in connection with a display on said terminal for interactive user selection of a view of desired columns of said very wide flat file to be displayed including selection of sequences of columns of data to be juxtaposed in the display on said screen from said very wide flat file.

8. A data processing method in accordance with claim 7, wherein said interactive means comprises means for user actuation of said system to select said columns of data through actuation of predetermined function key elements on said terminal.

9. A data processing method in accordance with claim 7, wherein the system provides selection of a list by steps as follows:

a) said very wide flat file including columns of data which can be viewed in a number of views which are available to said system, displaying on said display play screen a window of all of said available views for said very wide flat file being viewed, said views being available to be selected by user interaction with said function key elements, b) responding to the selection of said view of said very wide flat file to be displayed on said display screen, and c) displaying on said display screen the selected view of said very wide flat file.

10. A data processing method in accordance with claim 9, wherein said selected view of said very wide flat file is presented in the display on said display screen by said system editor operating in the edit mode.

11. A data processing method in accordance with claim 7, wherein the system performs the steps as follows:

a) getting a very wide flat file, b) opening said very wide flat file, c) displaying said very wide flat file on said display screen, d) displaying on said display screen a window of all of the available views for said very wide flat file being viewed, e) responding to the user selection by user interaction with said function key elements of the view of said very wide flat file to be displayed on said display screen, and f) displaying on said display screen the selected view of said very wide flat file on said display screen.

12. A method of editing a very wide flat file in a data processing system with a system editor operating in an edit mode without requiring a plural file relational database management system operating on more than one file at a time, and including a central processing unit with a screen manager, a random access storage device and a terminal with function key elements and with a display screen capable of displaying a predetermined number of columns at one time, means for storing data including very wide flat files in said random access storage device having a number of columns greater than said number that can be displayed at one time by said display screen, said method including a program performing the functions comprising:

retrieving data from a very wide flat file in said storage device into said processing unit, and managing the display of said columns of data including interactive means at said terminal for selection of sequences of columns of data to be juxtaposed on said display screen from said very wide flat file, calling the screen manager, then finding a list of viewing options for said very wide flat file, then displaying said very wide flat file on said display screen, and making a decision as to whether to end said program and in the case of a negative determination making a decision as to whether to select a list of viewing options, which in the case of an affirmative decision the program branches to presenting on said display screen of a list the available views for said very wide flat file being edited, selecting a view from said list of available views with said function key elements, and then presenting a window on said display screen of all of the available views for said very wide flat file being edited in an option list table, invoking an edit macro to call the data to be viewed with the columns to be displayed and permitting the user to edit said very wide flat file being displayed with the system editor by operation of said function keys for selecting columns of data from said option list, and then displaying on said display screen said very wide flat file edited with the sets of columns of data selected from said option list.

13. A method of editing a very wide flat file in a data processing system with a system editor operating in an edit mode without requiring a relational database management system operating on more than one file at a time, and including a central processing unit with a screen manager, a random access storage device and a terminal with function key means and a display screen capable of displaying a predetermined number of columns at one time, means for storing data in said random access storage device having a number of columns greater than said number that can be displayed at one time by said display screen, said method including a program performing the functions comprising:

retrieving data from said storage device into said processing unit, and managing the display on said screen of said columns of data including interactive function key means at said terminal for selection of sequences of columns of data to be juxtaposed on said screen, calling the screen manager, then finding a list of viewing options for said very wide flat file, then displaying said very wide flat file on said screen, and making a decision as to whether to end said program and in the case of a negative determination making a decision as to whether to select a list of viewing options, which in the case of an affirmative decision the program branches to presenting a list of the available views for said very wide flat file being edited, selecting a view of said very wide flat file from said list of available views, then presenting a window on said screen of all of the available views for said very wide flat file being edited in an option list table, then invoking an edit macro to call the data to be viewed with the columns to be displayed and permitting the user to edit said very wide flat file being displayed with the system editor selecting columns of data from said option list, and then displaying said very wide flat file edited with the sets of columns of data selected from said option list.

14. A method of editing a very wide flat file in a data processing system with a system editor operating in an edit mode without requiring a relational database management system (RDMS), without operating on more than one file at a time, and including a central processing unit with a screen manager, a random access storage device and a terminal with function key means and with a display screen capable of displaying a predetermined number of columns of said very wide flat file at one time, means for storing data in said random access storage device having a number of columns greater than said predetermined number of columns of said flat file that can be displayed at one time by said display screen, said method including a program for performing the functions comprising:

retrieving data including a said very wide flat file from said storage device into said processing unit, and managing the display of said columns of data of said very wide flat file including interactive means at said terminal for selection of sequences of columns of data to be juxtaposed on said screen, calling the screen manager, then finding a list of viewing options for said very wide flat file, then displaying said very wide flat file, and making a decision as to whether to end said program and in the case of a negative determination making a decision as to whether to select a list of viewing options, which in the case of an affirmative decision the program branches to presenting a list of the available views for said very wide flat file being edited, selecting a view from said list of available views, and then presenting a window of all of the available views for said very wide flat file being edited in an option list table, invoking an edit macro to call the data to be viewed with the columns to be displayed and permitting the user to employ said function key means to edit said very wide flat file being displayed with the system editor selecting columns of data from said option list, and then displaying said very wide flat file edited with the sets of columns of data selected from said option list.

15. A method of editing a very wide flat file in a data processing system with a system editor operating in an edit mode without requiring a relational database management system (RDMS) which operates on more than a single file at a time, without requiring a RDMS manipulation language, and without requiring the step of loading data into a RDMS constructed table including a central processing unit with a screen manager, a random access storage device and a terminal with function key means and with a display screen capable of displaying a predetermined number of columns at one time, means for storing data in said random access storage device including a very wide flat file having a number of columns greater than said number that can be displayed at one time by said display screen, said method including a program performing the functions comprising retrieving data from said storage device into said processing unit, and     managing the display of said columns of data in said very wide flat file including interactive means at said terminal for selection of sequences of columns of data of said very wide flat file to be juxtaposed on said screen,     calling the screen manager, then finding a list of viewing options for said very wide flat file, then displaying said very wide flat file, and making a decision as to whether to end said program and in the case of a negative determination making a decision as to whether to select a list of viewing options, which in the case of an affirmative decision the program branches to presenting a list of the available views for said very wide flat file being edited,     selecting a view from said list of available views, and     then presenting a window of all of the available views for said very wide flat file being edited in an option list table,     invoking an edit macro to call the data to be viewed with the columns to be displayed and permitting the user to edit said very wide flat file being displayed by activating said function key means with the system editor selecting columns of data from said option list, and     then displaying on said display screen said very wide flat file edited with the sets of columns of data selected from said option list table.

16. A data processing system for editing and viewing of very wide flat files containing more columns of data than a multiple column display screen in a display unit comprising a central processing unit, a random access storage device and a terminal with function key elements and with said display unit with said display screen being capable of displaying a predetermined number of columns of data at one time, said system including a system editor for operating in an edit mode, wherein the system performs the functions as follows:

a) means for storing data including a very wide flat file in said random access storage device having a number of columns of data greater than said number of columns of data that can be displayed at one time by said display screen, said very wide flat file being adapted to be viewed in a number of views which are available to said system,     b) means for retrieving data comprising a very wide flat file from said storage device into said processing unit, and     c) means for displaying a list of available views in a window on said display screen, means for operating said system editor in the edit mode to edit data to provide a view of said very wide flat file which view has been interactively selected for managing the the display of said columns of said very wide flat file on said display screen including interactive user operated editing means employing said system editor in connection with a display on said display screen of said terminal for interactive user selection with with function key elements of a view of desired columns of said very wide flat file to be displayed including selection of sequences of columns of data to be juxtaposed in the display on said screen,     said system working against a said very wide flat file prepared without a relational database management system which operates on more than a single file at a time,     said interactive means comprises means for user actuation of said system to select said columns of data from said very wide flat file through actuation of predetermined function key elements on said terminal,     said system operating without requiring a relational database management system,     the system provides selection of a list of columns of data in said very wide flat file by steps as follows:

1) said very wide flat file including said columns of data which can be viewed in a number of views which are available to said system, displaying on said display screen said window of all of said available views for said very wide flat file being viewed, said views being available to be selected by user interaction initiated with function key elements,         2) responding to the selection of said view of said very wide flat file to be displayed, and         3) displaying on said display screen the selected view of said very wide flat file, said selected view of said very wide flat file being presented in said display on said display screen by said system editor operating in the edit mode,         i) getting a very wide flat file,         ii) opening said very wide flat file,         iii) displaying said very wide flat file,         iv) displaying on said display screen a window of all of the available views for said very wide flat file being viewed,         v) responding to the selection with said function key elements of the view of said very wide flat file to be displayed by said display screen, and         vi) displaying the selected view of said very wide flat file.

17. A data processing system for editing and viewing very wide flat files containing more than the number of columns of data adapted to be displayed on a multiple column display screen of a display unit, said system including a central processing unit, a random access storage device and a terminal with function key elements and said display unit, said display screen of said display unit being capable of displaying a predetermined number of columns of data in a very wide flat file at one time, said system including a system editor for operating in an edit mode, wherein the system performs the functions as follows:

the easy editing of said very wide flat file for convenient viewing of selected columns of said data of said very wide flat through the use of a function key that invokes a window on said display screen which lists multiple possible combinations of views of said very wide flat file which can be selected to present a choice of fields to be viewed simultaneously on said screen, said fields representing a collection of columns which are a subset of the columns of said entire flat file, and     said system presenting selected columns of data of said very wide flat file in a narrow width to facilitate viewing, comprehending, and/or editing the data of said very wide flat file.

18. A method of operating a data processing system comprising a central processing unit, a random access storage device and a terminal with function key elements and with a display unit with a display screen capable of displaying a predetermined maximum number of columns of data of a very wide flat file at one time,     said function key elements comprising interactive means for user actuation of said system to select columns of data through actuation of predetermined function key elements on said terminal, said system including a system editor for operating in an edit mode to edit a view of a very wide flat file, said system operating upon said very wide flat file without requiring a plural file relational database management system operating on more than one file at a time, wherein the system performs the steps as follows:

a) storing data in at least one very wide flat file in said random access storage device having a number of columns of data greater than said number that can be displayed at one time by said display screen, said data in said very wide flat file being adapted to be viewed in a number of views which are available to said system b) retrieving data from a said very wide flat file in said storage device into said central processing unit, c) displaying in a window on said display screen of said display unit a list of all of said available views for said very wide flat file being viewed including selection of sequences of columns of data to be juxtaposed on the display on said screen from said very wide flat file, said views being available to be selected by user interaction with said function key elements, d) selecting a desired view to be displayed on said display screen by user interaction with said function key elements for employing said system editor in connection with a display on said terminal by interactive user selection of a view of desired columns of said very wide flat file to be displayed on said display screen, e) displaying on said display screen the desired view of said very wide flat file in response to the selection of said view of said very wide flat file by operating said system editor in the edit mode to edit data to provide a view of said very wide flat file which view has been interactively selected by one of said function key elements, whereby said method manages the display of said columns of data on said display screen with interactive user operated editing means.

* * * * *